United States Patent [19]

Clegg

[11] Patent Number: 4,492,439
[45] Date of Patent: Jan. 8, 1985

[54] MONOCHROMATIC BEAM CONCENTRATOR

[76] Inventor: John E. Clegg, 2320 Keystone Dr., Orlando, Fla. 32806

[21] Appl. No.: 358,468

[22] Filed: Mar. 15, 1982

[51] Int. Cl.³ .............................................. G02B 13/18
[52] U.S. Cl. ..................................... 350/432; 126/440
[58] Field of Search ............... 350/432, 443; 126/438, 126/439, 440

[56] References Cited

U.S. PATENT DOCUMENTS

| | | | |
|---|---|---|---|
| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |

Primary Examiner—John K. Corbin
Assistant Examiner—Scott J. Sugarman

[57] ABSTRACT

A conical stage lens consisting of three component lenses which receive a concentrated incipient beam of white light and emit a concentrated beam of monochromatic light. A concentrated beam of white light from a conical beam concentrator is received by the upper component lens, refracted through the middle component lens to the lower component lens which separates the beam into the spectral colors. Any one of the spectral colors can be emitted from the lower component lens, which is interchangeable, as a concentrated monochromatic beam, with the other colors being intercepted by a heat-absorbing metal shield and rod.

1 Claim, 4 Drawing Figures

MONOCHROMATIC BEAM CONCENTRATOR

BACKGROUND

The disclosure is a modification of the Conical Split-Image Microscopic Lens, U.S. Pat. No. 4,277,148, dated July 7, 1981, by this inventor. This microscopic lens is a beam concentrator also, and it is used to produce the concentrated incipient beam of white light received by the upper component lens of the monochromatic beam concentrator.

SUMMARY

The invention offers an alternative source of coherent monochromatic light which is now produced exclusively by lasers. The monochromatic beam concentrator can be powered by sunlight or artificial light, and manufacturing and operating costs will be greatly reduced below those costs of lasers.

DRAWINGS

DESCRIPTION

Figure 1:
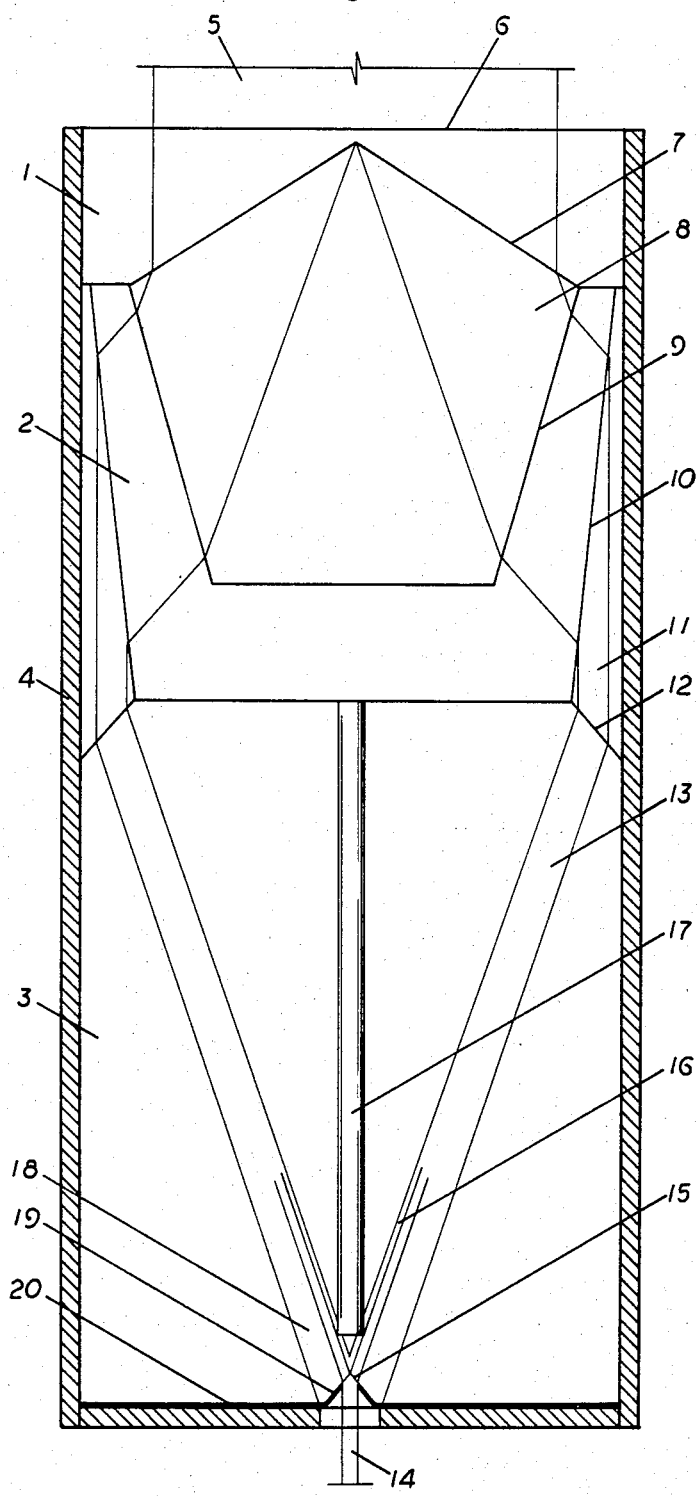
FIG. 1 is an elevation of the monochromatic beam concentrator with ray diagram.
Figure 2:
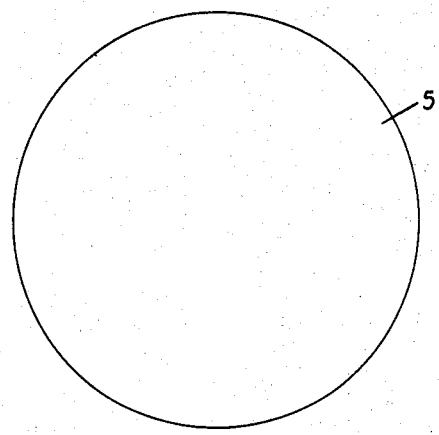
FIG. 2 is a cross section of the incipient beam.
Figure 3:
FIG. 3 is a cross section of the monochromatic beam.

The monochromatic beam concentrator shown in FIG. 1 consists of upper component lens 1, middle component lens 2 and lower component lens 3 aligned and mounted inside tubular casing 4. The concentrator is mounted below a conical beam concentrator which emits a concentrated beam of white light as the incipient beam 5 of the disclosure, the cross section of which is shown in FIG. 2. Incipient beam 5 is transmitted through perpendicular planar section 6 to concave conical section 7 of upper component lens 1. Concave conical section 7 refracts and separates the beam into conical beam 8, which is then refracted through concave conical section 9 and convex conical section 10 of middle component lens 2, forming annular beam 11.

Convex conical section 12 of lower component lens 3 receives annular beam 11, separates it into its spectral colors and refracts it inward to form spectral beam 13. Concentrated monochromatic blue beam 14 is emitted through concave conical section 15. Violet beam 16 is intercepted by heat-absorbing metal rod 17 which extends downward through the center of lower component lens 3 to the apex area of concave conical section 15. Red-green beams 18 are intercepted by truncated conical heat-absorbing metal shield 19 which is mounted inside concave conical section 15 and has a flange 20 to drain off excessive heat.

Blue occurs between 4240 Å and 4912 Å in the spectral band, with indices of refraction of 1.529 and 1.522. The median index is 1.526 at 4576 Å, and this index is used in calculating the angle of concave conical section 15 so as to emit a concentrated beam which is parallel to the optic axis.

Figure 4:
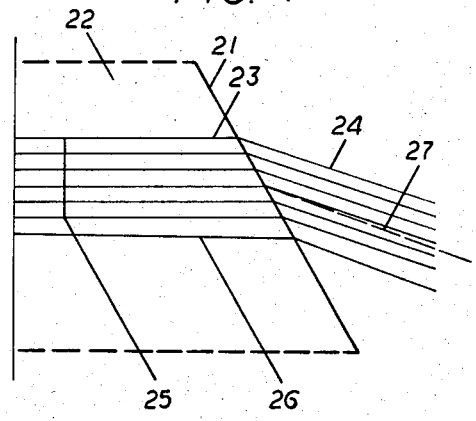
FIG. 4 is a cross section of the exit face of a spectroscopic prism with a ray diagram of red photon paths.

FIG. 4 is a cross sectional view of the exit face 21 of a conventional double-refraction spectroscopic prism 22. The top six lines in refracted beam 23 and spectral beam 24 represent the paths of propagation of red photons 25, and the bottom line represents the path of propagation of violet photon 26. The broken line represents the optic axis 27 of the magnifying lenses of the spectroscope.

The purpose of FIG. 4 is to show the source of Fraunhofer lines, which is the collisions between invisible convergent photons (such as the two lower red photons 25 which converge with the optic axis and are refracted out of the image forming the spectrum) and the visible divergent photons which form the spectrum. Fraunhofer lines will be eliminated from the beams produced by the monochromatic concentrator, inasmuch as those sections of the spectral band from which the convergent photons originate are intercepted.

I claim:

1. A monochromatic beam concentrator comprising three component lenses mounted in a tubular casing (4), with each component lens having one or two conical sections with surfaces which refract light rays at prescribed angles, with all conical sections being aligned on a common axis which is parallel to the light rays entering and emanating from the concentrator, with all surfaces not used for the refraction and transmission of light rays being opaque, with the three component lenses as follows;

(a) Upper component lens (1) mounted at the top of the beam concentrator with a planar section (6) which receives a perpendicular incipient beam (5) of light which is transmitted through the lens to the opposite section, and with a concave conical section (7) which receives the incipient beam (5) transmitted from the planar section (6) and separates and refracts the beam out of the upper component lens (1), forming conical beam (8);

(b) Middle component lens (2) mounted below upper component lens (1), with a concave conical section (9) which receives conical beam (8) refracted from concave conical section (7) and refracts the beam through the lens to the opposite section, and with a convex conical section (10) which receives conical beam (8) refracted from concave conical section (9) and refracts the beam out of the middle component lens (2), forming annular beam (11) which is parallel to the common axis; and (c) Lower component lens (3) mounted below middle component lens (2), with a convex conical section (12) which receives annular beam (11) refracted from convex conical section (10) and refracts the beam through the lens to the opposite section, forming spectral beam (13), with a concave conical section (15) which receives the spectral beam (13) refracted from convex conical section (12) and refracts the beam out of the lower component lens (3), forming concentrated monochromatic beam (14) which is emitted parallel to the common axis and parallel to the incipient beam (5), with a vertical heat-absorbing metal rod (17) occupying the apex area of the concave conical section (15) so as to intercept portions of spectral beam (13), and with a truncated conical heat-absorbing metal shield (19) mounted inside concave conical section (15) so as to intercept portions of spectral beam (13).

* * * * *